Jan. 5, 1954 E. A. WEISS ET AL 2,665,332
MAGNETIC MEASURING METHOD AND APPARATUS
Filed Nov. 25, 1949 4 Sheets-Sheet 1

INVENTORS.
ERIC A. WEISS &
J. RONDLE WRIGHT
BY
ATTORNEYS.

INVENTORS.
ERIC A. WEISS &
J. RONDLE WRIGHT

INVENTORS.
ERIC A. WEISS &
J. RONDLE WRIGHT
BY
ATTORNEYS.

INVENTORS.
ERIC A. WEISS &
J. RONDLE WRIGHT

Patented Jan. 5, 1954

2,665,332

UNITED STATES PATENT OFFICE 2,665,332

MAGNETIC MEASURING METHOD AND APPARATUS

Eric A. Weiss, Springfield, and J. Rondle Wright, Morton, Pa., assignors to Sun Oil Company, Philadelphia, Pa., a corporation of New Jersey Application November 25, 1949, Serial No. 129,482

22 Claims. (Cl. 324—14)

This invention relates to magnetic orientation or examination methods and apparatus, and particularly to methods and apparatus for the orientation and/or examination of rock cores.

Various systems have been provided for the determination of the position of the residual magnetic poles of rock cores drilled out of the ground. For example, there have been used systems of astatically arranged permanent magnets which are caused to deflect as a rock core is rotated in their vicinity. Proposals have also been made to rotate the cores in the vicinity of pick-up coils in which currents will be induced by the core field. In accordance with the present invention there are provided improved methods and apparatus for measuring the position of the magnetic poles or axes of cores and the magnitudes of the pole strengths thereof, which methods and apparatus avoid some of the difficulties heretofore encountered.

In accordance with the invention the relatively weak magnetic showings of a rock core can be amplified as electrical signals instead of depending on the mechanical movement of a magnet system as has been used practically in the past. Alternating current amplification may be used with the realization of the advantages of increased stability and increased amplification inherent therein. The effects of noise originating around the apparatus, due to magnetic storms, movements of magnetic material, and varying electric currents, can be discriminated against, and the use of magnetic shields, required in connection with previously used apparatus, may be dispensed with. Furthermore, the apparatus sensitivity may be greatly increased. The effect of noise originating in an amplifier may be substantially reduced in accordance with the invention. The invention, furthermore, makes possible the measurement of the variation in position of the magnetic poles along the length of a cylindrical core. Further, by utilization of the invention, spherical cores (turned from original approximately cylindrical cores) may be measured, spherical cores being turned about selected diameters thereby to determine the direction of magnetization of the core. Furthermore, details of the magnetic pole distribution around a sample may be measured to show the degree to which the magnetic poles are therein concentrated.

The invention is also applicable to measurements of magnetic susceptibility, as of drill cuttings, which may be placed in a hole drilled in a non-magnetic "core" of nylon, or the like, and compared with material of known susceptibility, such as a solution of an iron salt.

In accordance with the invention, these ends are achieved by rotating the core adjacent to a pickup element of a gradiometer of the saturable core type, with suitable detection of the signals, involving desirably the use of synchronous rectification to suppress noise arising magnetically or electrically. A pickup of the type just mentioned may be made small so as to give results corresponding to resolution of small areas of the core surfaces. Hence excellent localization of magnetic poles and axes may be secured.

The attainments of the various indicated ends constitute the primary objects of the present invention. These objects and others, particularly relating to details of apparatus and its operation will become apparent from the following description read in conjunction with the accompanying drawings, in which.

Figure 5A:
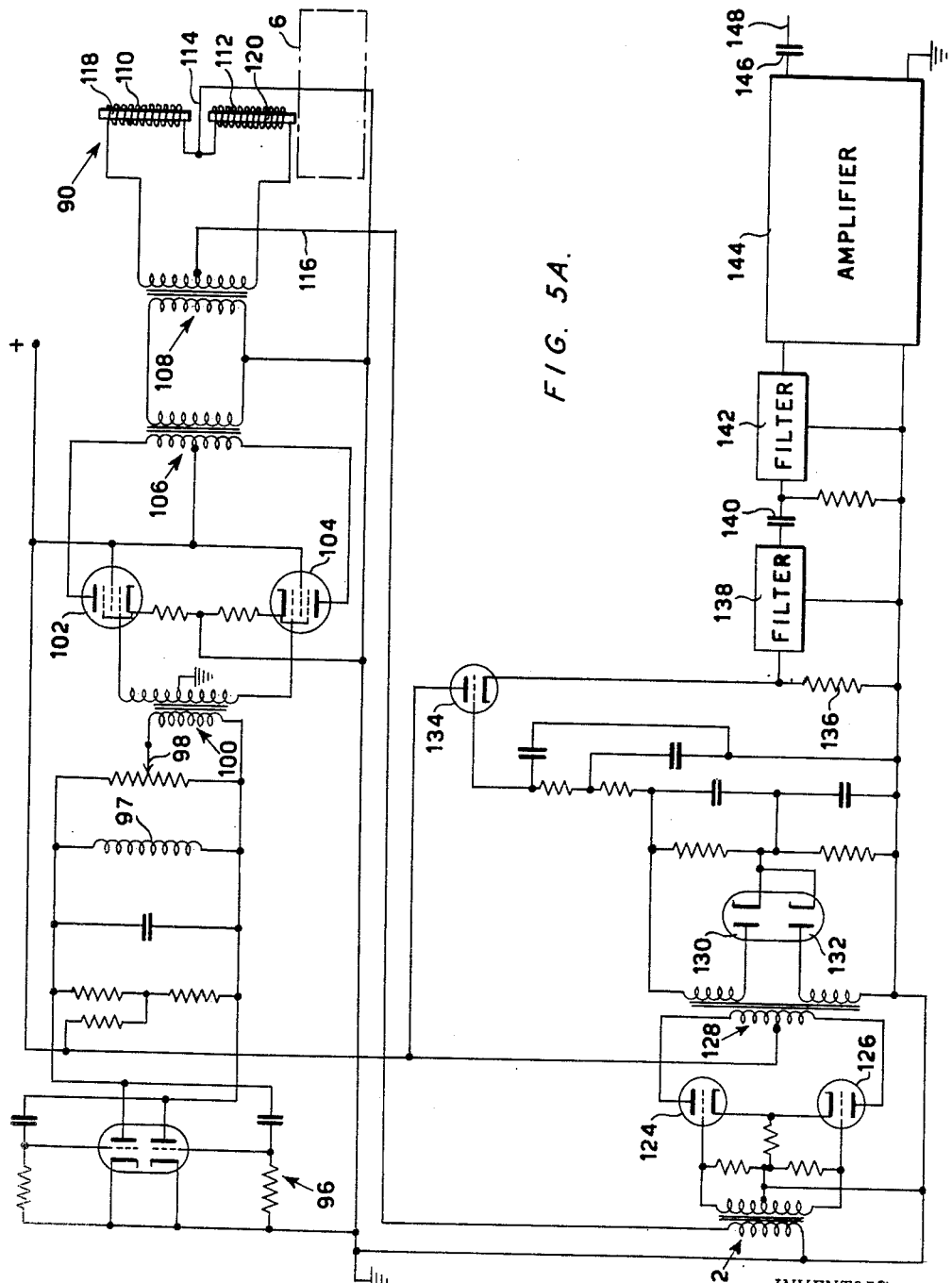
Figure 5B:
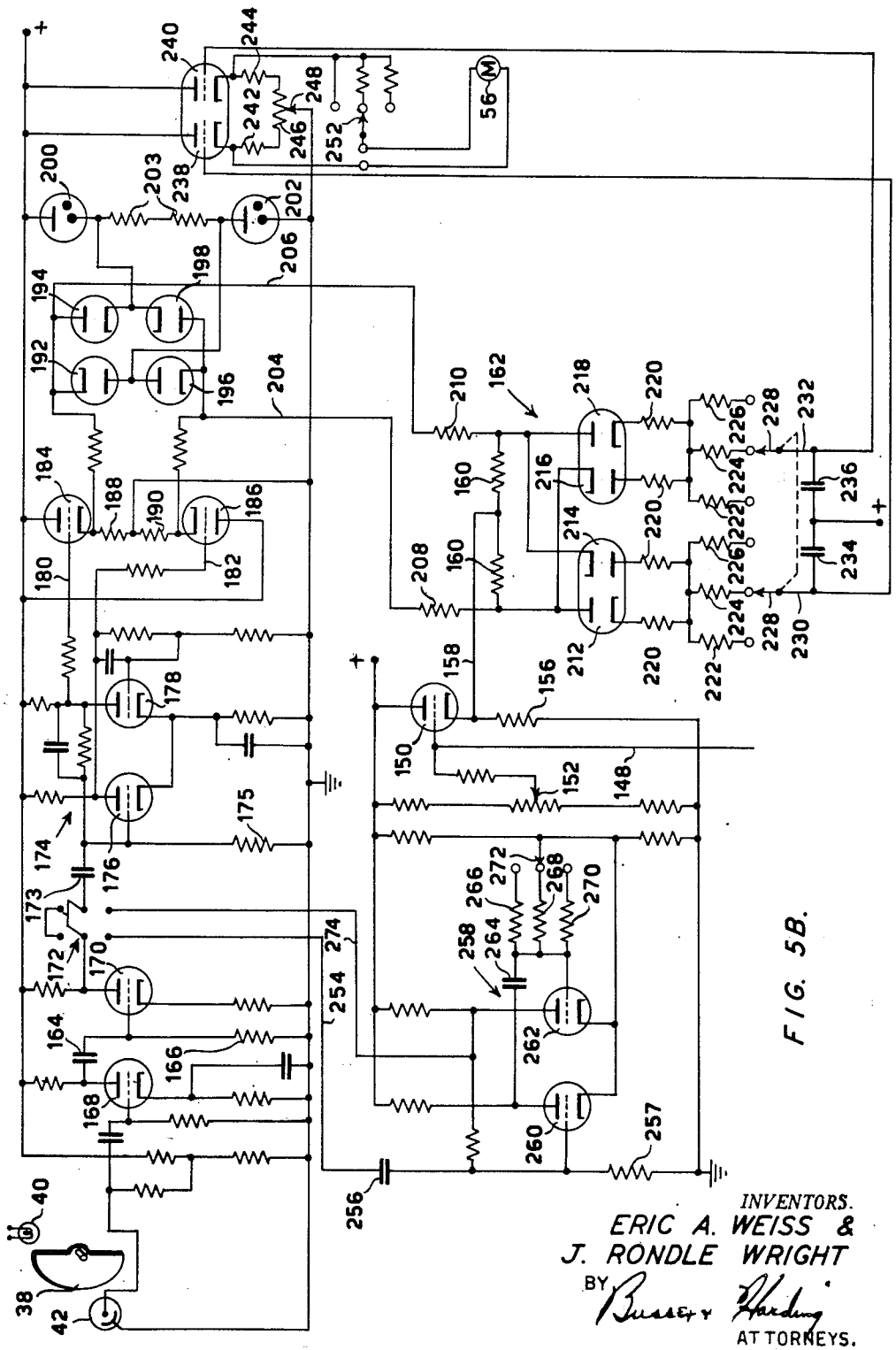
Figure 6:
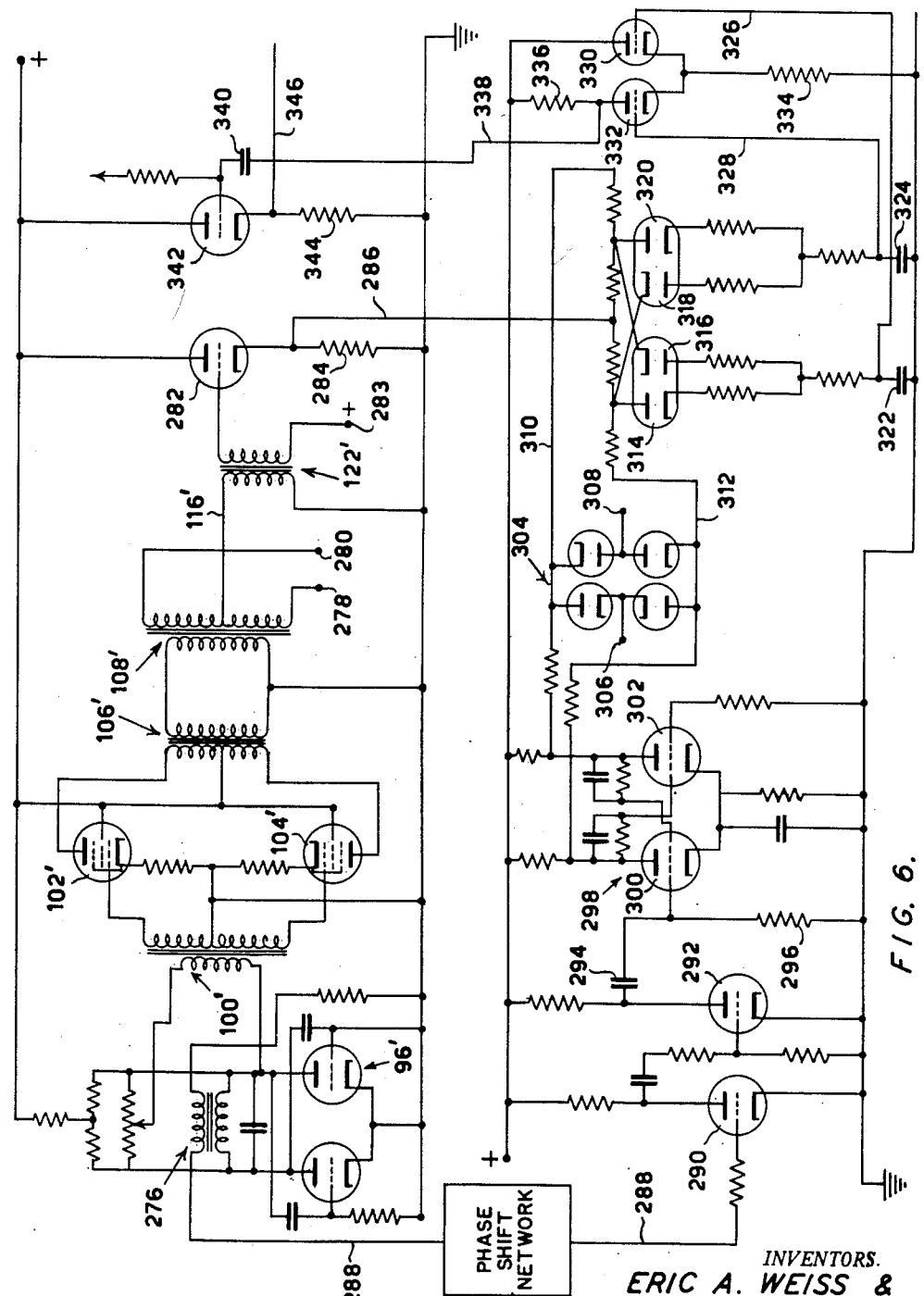

Figures 5A and 5B together constitute a wiring diagram showing the electrical details of one form of apparatus provided in accordance with the invention; and Figure 6 is a wiring diagram illustrating modifications of Figures 5A and 5B involved in a modified form of apparatus.

For simplicity and uniformity, reference will be made hereafter to the measurement of rock cores with the understanding that the invention is of broader applicability as indicated above.

Figure 2:
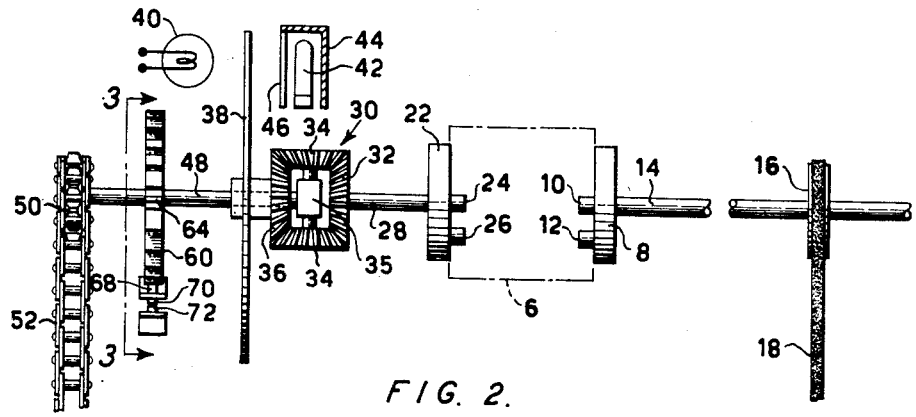
Figure 2 is a diagrammatic fragmentary plan of the portions of the apparatus particularly concerned with rotation of the core and the setting up of reference signals capable of phase adjustments.
Figure 3:
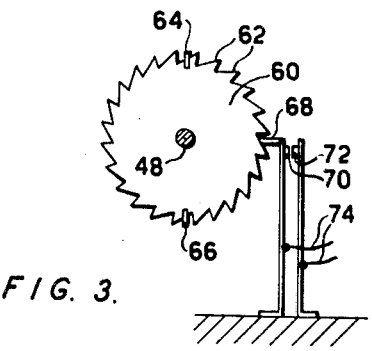
Figure 3 is a vertical section taken on the plane indicated at 3—3 in Figure 2.
Figure 1:
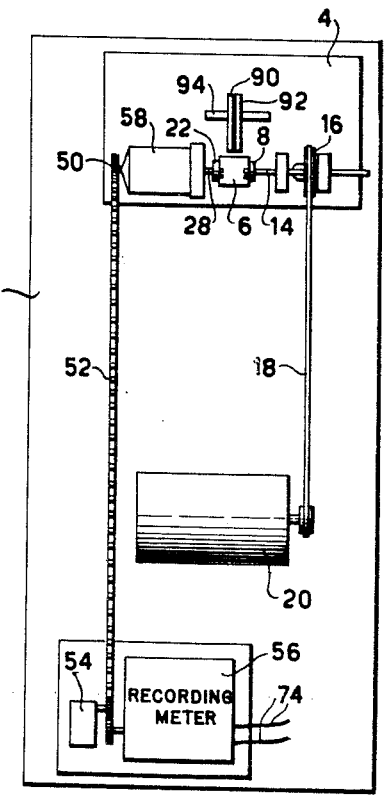
Figure 1 is a diagrammatic plan view of a core orienting apparatus provided in accordance with the invention.

Referring first to Figures 1, 2 and 3, there is provided a table 2 supporting various portions of the apparatus including the core turning assembly, indicated generally at 4, which should desirably be located spaced from its drive motor 20 and the recording meter and its drive motor indicated at 56 and 54, respectively. While, as will become apparent hereafter, the apparatus is relatively insensitive to stray magnetic fields, it is, of course, desirable to avoid the interference by these fields as far as possible.

A cylindrical core undergoing measurement is indicated at 6. This is driven through the medium of a disc 8 carrying pins 10 and 12 extending into openings in the core. The disc 8 is carried by a shaft 14 which, in turn, carries a pulley 16 driven through a belt 18 from a drive motor 20. At the end of the core 6 opposite the disc 8 is a second disc 22 provided with central and eccentric pins 24 and 26 and carried by a shaft 28. A planetary gear system, indicated generally at 30, has one of its bevel gears 32 carried by the shaft 28. Intermediate pinions 34 are mounted on a carrier 35 connected to a shaft 48 on which is journalled the gear 36 the hub of which carries a light occulting shutter 38 extending between a lamp 40 and a photocell 42 which is enclosed within a housing 44 provided with a slit 46 extending radially with respect to the shaft 48 and through which light may enter from the lamp 40. The rotating shutter 38 is desirably semi-circular in form, as indicated more particularly in Fig. 5B. Accordingly, as it rotates it serves to give rise to an approximately square wave output from the photocell 42. The shaft 48 carries a sprocket 50 which is driven by a chain 52 directed about sprockets on a chart drive motor 54 and the chart driving shaft of the recording meter 56. This meter 56 may be of any desired recording type but is preferably of the type which draws a curve corresponding to its input on a continuous strip of paper advanced by the operation of the motor 54 which contains internal gearing to cause it to drive the chain 52 at a low speed. A housing 58 desirably surrounds the photocell, the shutter and the lamp to avoid signals from the photocell due to extraneous sources.

As will become apparent hereafter the shutter 38 rotates at the same general speed as the core 6 but due to slow rotation of the shaft 48 its phase relationship to the core is slowly changed. To record this change of phase relationship there is provided on the shaft 48 a toothed wheel 60 provided, for example, with twenty-four teeth 62 arranged to act on the movable blade element 68 of a switch arrangement comprising contacts 70 and 72 in a circuit indicated at 74 which controls the making of marks along the edge of the recorder chart. At diametrically opposite points on the wheel 60 there are additional projections 64 and 66 for the purpose of adding marks to indicate a reference zero for phase measurement. As will appear from Figure 2, if the shaft 48 were stationary, the shutter 38 would rotate at the same rate as the core 6. A complete rotation of the shaft 48, however, will produce two complete rotations of the shutter relative to the core 6. Accordingly, half a revolution of the toothed wheel 60 represents a phase change of 360°. If the toothed wheel is provided with twenty-four teeth this, of course, means that a phase indicating marking will be made upon the record strip at each 30° interval.

The magnetic pick-up system involves a coil arrangement indicated generally at 90 carried by a support member 92 so that the pick-up may be moved toward and from the core undergoing observation. The carrier 92 may be moved axially along a track 94 to secure readings at various positions along the axis of the core.

Figure 4:
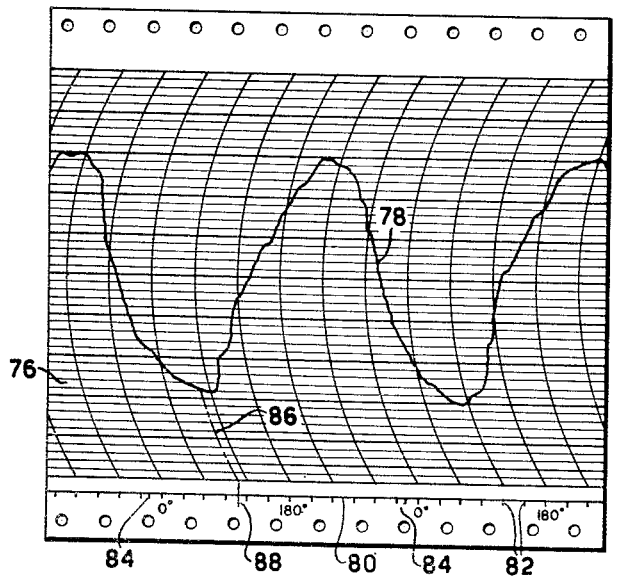
Figure 4 is a plan view of a typical chart provided by the apparatus and from which the magnetic characteristics of a core may be determined.

Before proceeding with a discussion of the electrical elements reference may be made to Figure 4 which shows a portion of a typical chart secured in the apparatus. This chart in the form of a paper strip 76 is driven lengthwise by the motor 54 and accordingly in time with the phase displacement of the shutter. The curve which is used and concerning which more will be said later is traced, as indicated at 78, by the recorder stylus. A marginal line is drawn by an auxiliary pen at 80 and lateral deviations from this line are produced as indicated at 82 by the closure of the contacts at 70 and 72, these markings being spaced to correspond to 30° changes of phase displacement. The markings at 84 are produced by the extra teeth at 64 and 66 and serve to indicate that the deviations 82 following them are marking zero phase displacement. It will be noted that the chart illustrated has a curved base so that a particular portion of the curve 78 must have its phase correspondence determined by drawing an arc 86 to the edge of the chart and then a marking 88 perpendicular to the line 80 to determine an intersection with this line.

The electrical system of the apparatus will become clear from consideration of Figures 5A and 5B. An exciting oscillator is indicated at 96. This may be of any type producing an alternating voltage of sinusoidal wave shape. The amplitude stability and frequency stability should be good but this feature is not extremely critical. While many other oscillators may be used, the conventional oscillator of multivibrator type, illustrated at 96, has been found highly satisfactory.

The desirable characteristics of this oscillator may be briefly mentioned. The exciting frequency used must be many times greater than the frequency of rotation of the rock sample under test since the detailed location of a pole on a sample is dependent upon there being many cycles of exciting current for each rotation of the sample. This gives a high degree of resolution. Similarly, the proper operation of the lock-in detector hereafter referred to depends upon the exciting frequencies being many times greater than the rotation frequency. Since the lower limit to the frequency of rotation is set by the lower limit of frequency for amplifiers which exhibit the good qualities of alternating current amplification, a lower limit is set to the exciting frequency. While the core may be rotated at various speeds, a speed of about ten revolutions per second has been found highly satisfactory, and consistently with this frequency there has been used an exciting oscillator frequency of 960 cycles per second. This frequency, however, is subject to large variation and may be in the range from approximately 500 cycles per second to 50 kilocycles per second with good results. In the interest of reducing interference from sixty cycle supply lines, the oscillator frequency chosen should not be that of any low harmonic of this power frequency. Nor should the rotation frequency be harmonically related to the power frequency. Too high a frequency may result in the production of self-oscillation of the coil and core combination of the pickup elements and this condition therefore imposes an upper limit to the oscillator frequency. It will be assumed in the following that the core rotates at approximately ten revolutions per second and that the frequency of the exciting oscillator 96 is 960 cycles per second, with the understanding that, as indicated, these frequencies are by no means critical.

The output from the oscillator 96 is fed through a potentiometer, the contact 98 of which may be adjusted to regulate the amplitude of the gradiometer exciting current. It is then fed through the transformer 100 to a push-pull output buffer amplifier comprising the pentodes 102 and 104 which in turn feed the output through the transformers 106 and 108 to the pickup which has been designated generally at 90. The use of two transformers is desirable to keep D. C. out of the primary of transformer 108 which should be well balanced, though a single specially constructed transformer may replace the two transformers illustrated.

This pickup is of the saturable core gradiometer type and comprises two substantially identical pickup elements. These comprise multi-turn solenoidal coils 110 and 112 wound on a hollow insulating form containing a core of highly permeable, easily saturable, ferro-magnetic material. These cores are indicated at 118 and 120. Care should be taken to match the two pickup elements electrically so that the exciting frequency will be balanced out from the output as completely as possible. In view of the use of an exciting oscillator of simple electronic type, the coils for the pickup elements should be of high impedance for impedance matching. For example, each coil used in one embodiment of the invention comprised about 2500 turns of No. 36 wire layer wound on a form one inch long.

The core material should be of high permeability, low retentivity and low coercive force and should be easily saturable. Molybdenum permalloy has been found satisfactory for this purpose. It has been found that material 0.0015 inch thick may be wound into a scroll and heat-treated to produce a highly satisfactory core. With respect to the heat treatment of such cores, reference may be made to an article by Elmen appearing in the Journal of the Franklin Institute of May 1929. The core material is desirably as thin as possible to reduce eddy currents therein. By rolling it into a scroll for use the core consists of as much total material as possible. Each coil should enclose its entire core so that the entire core is affected by the exciting field; but the cores must also be close to the ends of their coils so that the magnetic core of one of the elements may be brought up close to the rock core. It has been found satisfactory to make each coil of the same length as the magnetic core.

The coil cores are desirably made short so that a large proportion of the length of the one adjacent to the sample will lie close to the sample being measured, i. e., in the region of its maximum field. Assuming that the pickup element including the coil 112 is the one adjacent to the rock core this is so located, in adjustable fashion, as pointed out heretofore, as to extend radially with respect to the axis of rotation of the core. The other element may be coaxial with this but located at the end of the first element opposite the core. The actual location of this second element is not too important so long as it is located with its axis substantially parallel to the actual pickup element and so long as it is in the same vicinity so that any ambient magnetic field will have substantially the same intensity in the vicinity of both elements. The output from the arrangement just described is taken between the connection of the two coils 110 and 112 and the center tap of the secondary of transformer 108, i. e., between the lines indicated at 114 and 116. This output is fed through transformer 122 to an alternating current amplifier of conventional design comprising the triodes 124 and 126 in push-pull arrangement. Under the symmetrical conditions which have been described, the fundamental exciting frequency is substantially balanced out from the input to the amplifier. However, harmonics and in particular the second harmonic, are passed. The windings 110 and 112 of the pickup elements are so connected that, when excited by the oscillator, the magnetic cores present opposite magnetic poles towards each other. The arrangement is then that of a gradiometer giving an unbalanced response corresponding to the difference of the fields presented to the respective pickup elements of the pickup unit.

The output from the amplifier is fed through transformer 128 to a first detector which may be any of the well-known simple amplitude modulation or peak detectors employing thermionic or semi-conductor diodes, in either single-ended or double-ended arrangement. In the arrangement illustrated, the two secondaries of transformer 128 feed the double-ended thermionic diode circuit comprising a pair of diodes 130 and 132 arranged back-to-back to provide a peak subtraction.

The resulting signal put out by this detector, comprising the difference of the positive and negative peaks of the exciting frequency averaged over a plurality of cycles at that frequency, will consist of a desirable part having a frequency coresponding to that of the rotation of the core sample as well as other undesirable frequencies, namely, the unbalanced out remnant of the exciting frequency and picked-up hum from the main. It is accordingly desirable to apply filtering to discriminate against the undesired frequencies. A cathode follower stage including the triode 134 and cathode resistor 136 is employed in connection with filters to establish the desired impedance matching. The first of these filters indicated at 138 may be a filter to suppress the exciting frequency, for example, 960 cycles per second. This through condenser 140 feeds a second filter 142 designed to suppress the power frequency of 60 cycles per second. These filters may be of conventional type and need not be further described.

The signal emerging from the filter 142 is relatively small and requires additional amplification. This signal is primarily at the frequency of rotation of the sample. For the purpose of amplification, the amplifier 144 may be of any standard high gain type. However, a sharply tuned amplifier should be avoided since the rotational speed of the sample may not necessarily be maintained constant, and speed changes would cause amplitude changes in a signal being passed through a sharply tuned circuit. It has been found satisfactory to employ a conventional four-stage pentode single-ended amplifier with negative feed-back applied to each pair of stages. The output of the amplifier 144 delivered through condenser 146 is now to be synchronously rectified in a lock-in detector. Connection is provided at 148 to the grid of a triode 150 arranged in a cathode follower circuit with cathode resistor 156. The average direct potential of the grid of this cathode follower, and hence the average cathode potential, is adjustable by means of a potentiometer contact 152. The average direct cathode potential should be midway between the switching voltages of the following lock-in circuit. The output from the cathode follower is led through connection 158 to the junction point of the pair of equal resistors 160 forming part of the lock-in detector indicated generally at 162.

In order to accomplish the lock-in detection desired, a voltage of a frequency equal to the sample rotational frequency must be generated. While numerous ways of generating the reference voltage with phase adjustment may be used there will be described the photoelectric system which has been found particularly simple and reliable.

The lamp 40, rotating shutter 38, and photocell 42, previously described, are indicated in perspective diagram in Figure 5. The photocell output which is approximately a square wave at the frequency of rotation of the core sample, is amplified by triode 163, and then further amplified and limited by triode 170 having low frequency coupling to triode 168 by the arrangement of condenser 164 and resistor 166, and fed to a double-pole double-throw switch 172. There will first be considered the type of operation resulting when the switch 172 is in its upper position.

Under these conditions the output from triode 170 is fed, after differentiation by condenser 173 and resistor 175, directly to the flip-flop circuit indicated generally at 174 and including the triodes 176 and 178 in conventional connections. This flip-flop, triggered by the differentiated pulses, gives rise to square waves with very sharp sides, sharper than those which can conveniently be obtained through a shutter action. The resulting square waves, at substantially the frequency of rotation of the rock sample (neglecting the slight frequency difference resulting from the slow phase shift between the shutter and sample), are fed through connections 180 and 182 to the cathode follower arrangement of the triodes 184 and 186 and their cathode resistors 188 and 190. Clipping is then effected on both top and bottom of the waves to give flat tops to the square waves, this operation being effected through the circuit including the diodes 192, 194, 196 and 198 arranged as illustrated in conjunction with voltage regulating tubes 200 and 202 and resistors 203.

The resulting square wave is fed through connections 204 and 206 and equal resistors 208 and 210 to the lock-in detector heretofore referred to at 162. This may be of any of the forms described in the patent to Shawhan, No. 2,559,173, dated July 3, 1951. As described in said Shawhan patent a lock-in or synchronous rectifier of this type provides a tremendous degree of discrimination against non-synchronous undesired signals. While various forms of this Shawhan lock-in detector may be used, there is illustrated an arrangement, besides the connections already mentioned, of a set of four diodes 212, 214, 216 and 218 associated with equal resistors 220 and with additional pairs of equal resistors 222, 224, and 226 which may be selected into the circuit by coupled contact elements 228 to provide outputs at 230 and 232 to a pair of large condensers 234 and 236 center-connected to a point of potential symmetry in the circuit. The several resistors 222, 224 and 226 are provided to enable a selection of time constant of the lock-in system to be made. Extremely weak cores should be "looked at" for a longer period than strong cores.

The output from the synchronous rectifier is delivered to the cathode follower arrangements of triodes 238 and 240, the cathode resistors 242 and 244 of which are joined by a potentiometer 246 provided with an adjustable contact 248 for balance control of the meter 56, previously described, which receives the output from the cathodes. The sensitivity of this meter may be adjusted by the contact 252 associated with several resistors.

The operation of the apparatus so far described will now be evident. Assuming a particular phase relationship between the core and the shutter 38, it will be evident that the ultimate response secured on the meter 56 will involve the difference between the signals given from the core through one 180° portion thereof in comparison with the complementary 180°. From the standpoint of ultimate results these might well be considered the measurements of the actual magnetic intensity radial to the axis of rotation of the core as they might be picked up by a magnetically responsive element having a very low frequency or direct response. Actually, of course, the effective signals picked up by the gradiometer are of this nature despite the fact that the gradiometer is excited at the frequency of the oscillator 96. This frequency disappears at the diodes 130 and 132 and any residual components are removed by the filter 133 and the action of the synchronous rectifier. Considering Figure 4, it will be evident that the peaks of the traced curve correspond successively to the predominantly north and south poles of the core in the region scanned by the gradiometer, the phase shift of the shutter 38 with respect to the core producing, in effect, a scanning of its circumference. In other words, through one particular short interval of time for which the phase may be considered effectively constant, a particular 180° of the core circumference is compared with the complementary 180°, giving one point on the traced curve; then after the phase changes appreciably this comparison is made between another pair of 180° arcs, and so on. The result is, of course, not one of high resolution in this type of operation, but nevertheless the points of predominant polarity may be well located. The shift of phase produced by rotation of shaft 46 is quite slow compared to the rate of rotation of the sample so that through a comparatively large number of rotations of the sample the phase, and the resulting output signal is essentially constant.

In operation it is desirable to substitute for the core which is undergoing measurement a dummy core which may consist of a cylinder (or sphere) of non-magnetic material, such as a plastic, carrying a small magnet so as to have a polarity somewhat analogous to that involved in a natural core. By the use of such a dummy at intervals, it is possible to calibrate the apparatus and insure not only that it is in good working order but that the proper polarities are being ascribed to the measured curve of a natural core. This is convenient and eliminates the necessity for studying the circuit connections to determine polarity or to make more indirect checks on sensitivity and operation.

If it is desirable to secure better resolution of details of the signal wave form, the amplified and limited output of the photocell 42 is switched to a monostable trigger circuit by the location of the double-pole, double-throw switch 172 in its lower position as illustrated in Figure 5B. When the switch is so positioned, the output from the anode of triode 170 is delivered through connection 254 and condenser 256, which with resistor 257 provides differentiation of the square wave, to the grid of a triode 260 which is associated with a second triode 262 in a monostable trigger circuit indicated generally at 258. On the rise of an incoming square wave from the photocell, the trigger circuit flips to its unstable state and remains in the unstable state for a short time and then flops back to its stable state. The interval during which it is in its unstable state depends upon the condenser 264 and one of the resistors 266, 268 and 270 which may be selected into the circuit through the action of the selector switch 272. Output pulses are delivered from the anode of triode 262 through connection 274 to the grid of triode 176 and from this point on the operation is similar to that previously described except that under these conditions the square wave is no longer symmetrical as delivered to the synchronous rectifier. Instead, what amounts to gates are selected for arcs such as, for example, ten, twenty, or thirty degrees. It will be evident that, under these conditions, a sharper, better resolved picture of the magnetic condition of the core will be secured than in the case of the first modification described, the comparisons of the magnetic field of the sample now being, for example of 10° of arc against 350°, etc.

Instead of using diode detection, as by the diode detection, as by the diodes 130 and 132 in Figure 5A, there may be used lock-in detection of the signals from the gradiometer at exciting frequency. This is illustrated in Figure 6 which shows the modifications of certain parts of Figure 5A required to achieve this end. Since certain parts of Figure 6 correspond to those in Figure 5A, these parts are designated in Figure 6 by the same reference numerals as in Figure 5A but with appended primes.

The exciting oscillator 96' in Figure 6 is similar to that in Figure 5A except that an additional signal is taken from the oscillator through transformer 276 which replaces the inductance 97 in Figure 5A. The main oscillator output is fed through the elements 100', 102', 104', 106' and 108' precisely as in Figure 5A, the ends of the secondary winding of the transformer 109' being connected at 278 and 280 to the coils of a gradiometer of the type illustrated in Figure 5A. The gradiometer output is delivered through connection 116' and transformer 122' to a cathode follower 282, provided with a cathode resistor 284, this cathode follower taking the place of the push-pull stage involving the triodes 124 and 126 of Figure 5A. The cathode of the triode 282 of this cathode follower stage is connected through line 286 to a lock-in detector.

The exciting frequency signals delivered from the secondary of transformer 276 pass through line 288, which desirably includes a conventional adjustable phase shift network indicated at 289, to the grid of a triode 290 associated with a second triode 292 to provide amplification and clipping. The output from the anode of triode 292 consists of a square wave with sharp sides. This square wave is differentiated by the arrangement of condenser 294 and resistor 296 and the resulting spikes are fed to an Eccles-Jordan bistable trigger circuit indicated generally at 298 and comprising the triodes 300 and 302 in a conventional circuit of this type. The swings at the anodes of triodes 300 and 302 may be quite large, for example, from plus 125 volts to plus 225 volts. The square wave output thus provided is fed through a limiter 304 comprising an array of diodes in conventional fashion, with connections 306 and 308 maintained, for example, at plus 200 volts and plus 150 volts, respectively. The resulting output delivered through lines 310 and 312 is a square wave which varies between plus 150 volts and plus 200 volts. In order to match this with the triode 282 the grid of triode 282 is maintained at terminal 283 at a mean average potential of plus 175 volts, consistent with the voltage values previously given. The signals through line 286 and the switching signals through lines 310 and 312 are applied to the lock-in detector of the type described in said Shawhan patent. This includes the diodes 314, 316, 318 and 320 symmetrically arranged in a symmetrical network of resistors of the type previously indicated and as described in said Shawhan patent. The first pair of diodes are connected to a condenser 322 and the second pair of diodes are connected to a condenser 324 which accumulate charges the difference of which is proportional to the useful signals. The time constants of the synchronous rectifier are to be so chosen as to give rise to signals at the core frequency; i. e., the demodulation effected is only of the exciting frequency. In order to make use of the difference in condenser charges the condensers 322 and 324 are respectively connected at 326 and 328 to the grids of triodes 330 and 332 which have a common cathode resistor 334 thus providing a differential amplifier. From the junction between the load resistor 336 and the anode of triode 332 the differential output is taken through connection 338 and condenser 340 to the grid of triode 342 in a cathode follower circuit including the cathode resistor 344. The output is taken from the cathode of triode 342 through connection 346 which feeds into a filter and subsequent circuit corresponding to the filter 138 of Figure 5A and the elements following the same, including a filter 142 and the amplifier 144.

It will be evident that the arrangement just described provides at the output of the amplifier 144 the same type of signals as the diode detection arrangement of Figure 5A, there being secured, however, the advantage of synchronous rectification or detection with its high discrimination against undesired signals. This last arrangement is accordingly desirable where, due to unavoidable causes, there may be a considerable noise at higher frequencies which is non-synchronous with the exciting frequency of the gradiometer.

The two methods of detection which have been referred to are not the only ones which may be used and, at this point, a general reference may be made to the operations of a two-element saturable core magnetic gradiometer.

If the two pickup elements of the gradiometer were exactly balanced electrically, both in their linear and non-linear characteristics, and the two elements were placed in a truly zero magnetic field, the exciting frequency would be balanced out between the two coils and there would be no output under such conditions. This balance is not possible under practical conditions, largely because there are always differences in the non-linear characteristics which are related to differences in the cores. As a consequence of this unbalance, the output of a gradiometer having equal magnetic fields applied to each of the elements contains the fundamental frequency and its harmonics, chiefly the odd harmonics. Under these conditions the output exhibits a series of sharp peaks, with the positive and negative peaks being equal in height. If, then, unequal fields are applied to the two elements, the following circumstances occur:

(a) The even harmonic content of the output increases. This appears as a change in the relative heights of the positive and negative peaks, one peak becoming higher than the other.

(b) The amplitude of the fundamental changes.

(c) The amplitudes of the odd harmonics change.

(d) The phase relationships of the fundamental and the harmonics change with relation to the exciting frequency as a reference.

It will be evident from the foregoing considerations that there are possible many detection schemes which may be used to give rise to a measurement of the magnetic gradient which is involved in the region of the two pickup elements.

The arrangement illustrated in Figure 5A detects the relative heights of the positive and negative peaks, and accordingly, responds, in effect, to the even harmonic content of the output.

In contrast with this the system of Figure 6 depends for its operation on the matters (b) and (d), namely, the changes in amplitude of the fundamental frequency and the change in phase of the fundamental frequency with respect to the exciting frequency.

It will be evident that, if in a scheme such as Figure 6, lock-in detection is used, the lock-in frequency may be the fundamental exciting frequency, or any of its odd or even harmonics. It would ordinarily be expected that even harmonics would yield somewhat greater sensitivity than odd harmonics, with the sensitivity decreasing as the order increases.

The invention has been described as giving rise to curves such as illustrated in Figure 4. The interpretation of such curves is not a part of the present invention and depends to a great extent upon experience of the interpreter. By using cylindrical cores a series of curves may be secured for each core by scanning through the use of the gradiometer different portions of its axial extent. In general, different curves may be obtained as progress is made along the axis. Shift of polarity may appear which, in some cases, may be interpreted as the change in direction of magnetization due to shift of the magnetic field of the earth during the period of deposition of the rock sample undergoing measurement. Such results may be geologically interpreted and, in particular, may be used to compare samples obtained at different locations. The comparison of shift of magnetic axis along the lengths of a plurality of cores serves to correlate such cores and indicate whether or not they correspond in geological time.

Cylindrical cores of the type primarily referred to are generally turned or ground from the original cores obtained in drilling so that their axes extend parallel to the axes of the original cores. Using the cylindrical cores, measurements are made of magnetization perpendicular to this axis. But at times more informative results may be obtained if the original cores obtained during drilling are turned to provide spherical samples. Such samples may be mounted in obvious fashion corresponding generally to the mounting of cylindrical cores, but during measurement, they may be caused to turn about various axes so that the results secured will correspond to components of their magnetization in various directions. In particular, magnetization due to the vertical component of the earth's field will be susceptible to measurement, and the direction of the vector of magnetization may be determined. The direction of the vector of magnetization may, in particular, be determined by making successive measurements with the cores rotating about three mutually perpendicular axes in successive runs. Finally a check on the results may be secured by rotating the spherical sample about the axis corresponding to the calculated vector of magnetization and about a pair of mutually perpendicular axes perpendicular to the last mentioned axis. It may be noted that such measurements will generally result in obtaining maximum responses from very weakly magnetized samples, the results from which may otherwise be in doubt. It will be evident that through accumulated experience the results thus secured may be interpreted to give items of information of geological significance.

The apparatus may also be used for the measurement of magnetization or susceptibility of other samples, as of rock cuttings or the like carried in or by a non-magnetic carrier.

What is claimed is:

1. Magnetic measuring apparatus comprising means for mounting and rotating a sample; a magnetic gradiometer including a pickup of the saturable core type, means for exciting said pickup at a frequency substantially higher than the frequency of rotation of the sample, and means for demodulating signals from said pickup to give signals at the frequency of rotation of the sample; and means for mounting said pickup adjacent to the rotating sample.

2. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from said pickup to give signals at the frequency of rotation of the sample and means for rectifying the last mentioned signals in synchronism with the rotation of the sample; and means for mounting said pickup adjacent to the rotating sample.

3. Magnetic measuring apparatus comprising means for mounting and rotating a sample; a magnetic gradiometer including a pickup of the saturable core type, means for exciting said pickup at a frequency substantially higher than the frequency of rotation of the sample, and means for demodulating signals from said pickup to give signals at the frequency of rotation of the sample and having an amplitude corresponding to the difference between positive and negative peaks of the signals from the pickup; and means for mounting said pickup adjacent to the rotating sample.

4. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from said pickup to give signals at the frequency of rotation of the sample and having an amplitude corresponding to the difference between positive and negative peaks of the signals from the pickup, and means for rectifying the last mentioned signals in synchronism with the rotation of the sample; and means for mounting said pickup adjacent to the rotating sample.

5. Magnetic measuring apparatus comprising means for mounting and rotating a sample; a magnetic gradiometer including a pickup of the saturable core type, means for exciting said pickup at a frequency substantially higher than the frequency of rotation of the sample, and means for demodulating signals from said pickup synchronously with respect to the exciting frequency to give signals at the frequency of rotation of the sample; and means for mounting said pickup adjacent to the rotating sample.

6. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from said pickup synchronously with respect to the exciting frequency to give signals at the frequency of rotation of the sample and means for rectifying the last mentioned signals in synchronism with the rotation of the sample; and means for mounting said pickup adjacent to the rotating sample.

7. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample, and synchronous rectifying means receiving said lock-in signal and said signals produced by demodulation to give rise to resulting signals substantially constant through a period of multiple rotations of the sample; and means for mounting said pickup adjacent to the rotating sample.

8. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample but varying slowly in phase with respect to the rotation of the sample, and synchronous rectifying means receiving said lock-in signal and said signals produced by demodulation to give rise to resulting signals substantially constant through a period of multiple rotations of the sample; and means for mounting said pickup adjacent to the rotating sample.

9. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample but variable in phase with respect to the rotation of the sample, and synchronous rectifying means receiving said lock-in signal and said signals produced by demodulation to give rise to resulting signals substantially constant through a period of multiple rotations of the sample; and means for mounting said pickup adjacent to the rotating sample.

10. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample but varying slowly in phase with respect to the rotation of the sample, synchronous rectifying means receiving said lock-in signal and said signals produced by demodulation to give rise to resulting signals substantially constant through a period of multiple rotations of the sample and means for continuously recording variations of the last mentioned signals with respect to changes in phase of the lock-in signal; and means for mounting said pickup adjacent to the rotating sample.

11. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample, said lock-in signal comprising a square wave having positive and negative components of unequal duration, and synchronous rectifying means receiving said lock-in signal and said signals produced by demodulation to give rise to resulting signals substantially constant through a period of multiple rotations of the sample; and means for mounting said pickup adjacent to the rotating sample.

12. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample, said lock-in signal comprising a square wave having positive and negative components of unequal duration and varying slowly in phase with respect to the rotation of the sample, and synchronous rectifying means receiving said lock-in signal and said signals produced by demodulation to give rise to resulting signals substantially constant through a period of multiple rotations of the sample; and means for mounting said pickup adjacent to the rotating sample.

13. Magnetic measuring apparatus comprising means for mounting and rotating a sample; a magnetic gradiometer including a pickup of the saturable core type, means for exciting said pickup at a frequency substantially higher than the frequency of rotation of the sample, means for demodulating signals from the pickup to give signals at the frequency of rotation of the sample, means providing a lock-in signal at substantially the frequency of rotation of the sample, said lock-in signal comprising a square wave having positive and negative components of unequal duration and variable in phase with respect to the rotation of the sample, and synchronous rectifying means receiving said lock-in signal and said signals produced by demodulation to give rise to resulting signals substantially constant through a period of multiple rotations of the sample; and means for mounting said pickup adjacent to the rotating sample.

14. The method of measurement of the magnetic characteristics of a rock core comprising producing from the core a spherical sample, rotating the sample about one axis adjacent to a magnetic pickup, rotating the sample adjacent to the pickup about another axis, and measuring the outputs of the pickup resulting from said rotations.

15. The method of measurement of the magnetic characteristics of a rock core comprising producing from the core a spherical sample, rotating the sample about one axis adjacent to a magnetic pickup, rotating the sample adjacent to the pickup about another axis perpendicular to the first mentioned axis, and measuring the outputs of the pickup resulting from said rotations.

16. The method of measurement of the magnetic characteristics of a rock core comprising producing from the core a spherical sample, rotating the sample about one axis adjacent to a magnetic pickup, rotating the sample adjacent to the pickup about another axis perpendicular to the first mentioned axis, rotating the sample adjacent to the pickup about a third axis perpendicular to both of the aforementioned axes, and measuring the outputs of the pickup resulting from said rotations.

17. Magnetic measuring apparatus comprising means for mounting and rotating a sample; a magnetic detector including a pickup and means responsive to the pickup and providing output signals at the frequency of rotation of the sample; and means for rectifying said output signals in synchronization with the rotation of the sample.

18. Magnetic measuring apparatus comprising means for mounting and rotating a sample; a magnetic detector including a pickup and means responsive to the pickup and providing output signals at the frequency of rotation of the sample; means providing a lock-in signal at substantially the frequency of rotation of the sample; and synchronous rectifying means receiving said lock-in signal and said output signals to give rise to resulting signals substantially constant through a period of multiple rotations of the sample.

19. Magnetic measuring apparatus comprising means for mounting and rotating a sample; a magnetic detector including a pickup and means responsive to the pickup and providing output signals at the frequency of rotation of the sample; means providing a lock-in signal at substantially the frequency of rotation of the sample, but varying slowly in phase with respect to the rotation of the sample; and synchronous rectifying means receiving said lock-in signal and said output signals to give rise to resulting signals substantially constant through a period of multiple rotations of the sample.

20. Magnetic measuring apparatus comprising means for mounting and rotating a sample; a magnetic detector including a pickup and means responsive to the pickup and providing output signals at the frequency of rotation of the sample; means providing a lock-in signal at substantially the frequency of rotation of the sample, but variable in phase with respect to the rotation of the sample; and synchronous rectifying means receiving said lock-in signal and said output signals to give rise to resulting signals substantially constant through a period of multiple rotations of the sample.

21. Magnetic measuring apparatus comprising means for mounting and rotating a sample; a magnetic detector including a pickup and means responsive to the pickup and providing output signals at the frequency of rotation of the sample; means providing a lock-in signal at substantially the frequency of rotation of the sample, said lock-in signal comprising a square wave having positive and negative components of unequal duration; and synchronous rectifying means receiving said lock-in signal and said output signals to give rise to resulting signals substantially constant through a period of multiple rotations of the sample.

22. Magnetic measuring apparatus comprising means for mounting and rotating a sample; a magnetic detector including a pickup and means responsive to the pickup and providing output signals at the frequency of rotation of the sample; means providing a lock-in signal at substantially the frequency of rotation of the sample, said lock-in signal comprising a square wave having positive and negative components of unequal duration and variable in phase with respect to the rotation of the sample; and synchronous rectifying means receiving said lock-in signal and said output signals to give rise to resulting signals substantially constant through a period of multiple rotations of the sample.

ERIC A. WEISS.
J. RONDLE WRIGHT.

References Cited in the file of this patent

UNITED STATES PATENTS

| Number | Name | Date |
|---|---|---|
| 2,217,768 | Pearson | Oct. 15, 1940 |
| 2,260,562 | Dillon | Oct. 28, 1941 |
| 2,379,716 | Hull | July 3, 1945 |
| 2,407,202 | Vacquier | Sept. 3, 1946 |
| 2,418,553 | Irwin | Apr. 8, 1947 |
| 2,500,680 | Herrick et al. | Mar. 14, 1950 |